US005902951A

United States Patent [19]

Kondo et al.

[11] Patent Number: 5,902,951

[45] Date of Patent: May 11, 1999

[54] CHORUS EFFECTOR WITH NATURAL FLUCTUATION IMPORTED FROM SINGING VOICE

[75] Inventors: Takayasu Kondo; Yuji Ikegaya; Yasuo Yoshioka, all of Hamamatsu, Japan

[73] Assignee: Yamaha Corporation, Hamamatsu, Japan

[21] Appl. No.: 08/922,891

[22] Filed: Sep. 3, 1997

[30] Foreign Application Priority Data

Sep. 3, 1996 [JP] Japan .................................... 8-233307

[51] Int. Cl.[6] ............................... G09B 5/04; G10H 1/02; G10H 7/00

[52] U.S. Cl. ........................... 84/610; 84/631; 84/DIG. 4; 434/307 A

[58] Field of Search ............................. 84/609–614, 631, 84/634–638, DIG. 4; 434/307 A

[56] References Cited

U.S. PATENT DOCUMENTS 5,393,927 2/1995 Aoki .......................................... 84/631
5,521,326 5/1996 Sone .......................................... 84/631
5,686,684 11/1997 Nagata et al. ............................ 84/631
5,712,437 1/1998 Kageyama ................................ 84/610
5,719,346 2/1998 Yoshida et al. ........................... 84/631

FOREIGN PATENT DOCUMENTS 62-65098 3/1987 Japan .

*Primary Examiner*—Stanley J. Witkowski
*Attorney, Agent, or Firm*—Pillsbury Madison & Sutro LLP

[57] ABSTRACT

A chorus apparatus is constructed for creating a chorus sound to accompany a vocal sound which is sung by a singer. In the chorus apparatus, a providing device provides music information including reference pitch information which indicates a regular variation of an actual pitch of the vocal sound and harmony pitch information which determines a harmony pitch of the chorus sound. A detecting device detects the actual pitch of the vocal sound containing the regular variation and an irregular fluctuation which overlaps the regular variation. A controlling device extracts the irregular fluctuation of the actual pitch from the vocal sound according to the reference pitch information, and modifies the harmony pitch information to impart thereto a desired fluctuation corresponding to the irregular fluctuation extracted from the vocal sound. A generating device operates according to the modified harmony pitch information for generating the chorus sound containing the desired fluctuation over the harmony pitch. A mixing device mixes the vocal sound and the chorus sound with each other.

16 Claims, 4 Drawing Sheets

CHORUS EFFECTOR WITH NATURAL FLUCTUATION IMPORTED FROM SINGING VOICE

BACKGROUND OF THE INVENTION

The present invention generally relates to a chorus effect attaching apparatus for use in a karaoke apparatus.

Various karaoke apparatuses have been proposed. In one type of the karaoke apparatuses, a chorus sound is generated by performing pitch conversion (processing for raising or lowering a scale) on a singing voice (hereafter, referred to as a vocal sound) inputted from a microphone so as to attach the generated chorus sound to the vocal sound.

Meanwhile, to perform an agreeable chorus, it is basically important to generate a chorus sound at a proper pitch concordant with a vocal sound. It is more important, however, to simulate a natural chorus sound actually uttered by a human being for the agreeable chorus performance. From this point of view, the following explains an actually uttered human voice (or a natural voice). The pitch of a natural voice is always fluctuating. This pitch fluctuation mostly contributes to "naturalness" of the actual human voice. In the above-mentioned conventional karaoke apparatuses, the chorus sounds are generated with a pitch strictly designated by harmony pitch information, or with a fixed pitch that does not fluctuates, thereby inevitably resulting in an artificial chorus sound that sounds synthetic or unnatural to the ear.

SUMMARY OF THE INVENTION

It is therefore an object of the present invention to provide a chorus apparatus for generating a chorus sound having a naturally fluctuating pitch and for attaching the resultant chorus sound to a vocal sound.

According to the present invention, a chorus apparatus is constructed for creating a chorus sound to accompany a vocal sound which is sung by a singer. In the chorus apparatus, a providing device provides music information including reference pitch information which indicates a regular variation of an actual pitch of the vocal sound and harmony pitch information which determines a harmony pitch of the chorus sound. A detecting device detects the actual pitch of the vocal sound containing the regular variation and an irregular fluctuation which overlaps the regular variation. A controlling device extracts the irregular fluctuation of the actual pitch from the vocal sound according to the reference pitch information, and modifies the harmony pitch information to impart thereto a desired fluctuation corresponding to the irregular fluctuation extracted from the vocal sound. A generating device operates according to the modified harmony pitch information for generating the chorus sound containing the desired fluctuation over the harmony pitch. A mixing device mixes the vocal sound and the chorus sound with each other.

Preferably, the generating device comprises a converter that converts the actual pitch of the vocal sound according to the harmony pitch information to create the chorus sound. Alternatively, the generating device comprises a synthesizer that synthesizes the chorus sound according to the harmony information independently from the vocal sound.

Preferably, the controlling device comprises an extractor that calculates a ratio of the actual pitch relative to the reference pitch so as to extract the irregular fluctuation in terms of the calculated ratio, and a modifier that adds the calculated ratio to the harmony pitch information so as to modify the harmony pitch information.

Preferably, the controlling device further comprises a limiter that limits the calculated ratio when the actual pitch falls out of tune relative to the reference pitch so as to avoid an excessive fluctuation of the pitch of the chorus sound. Preferably, the controlling device further comprises a filter that filters the extracted irregular fluctuation containing a true fluctuation component having a high frequency and a false fluctuation component having a low frequency caused by the regular pitch variation relative to the reference pitch so as to extract only the true fluctuation component. Preferably, the controlling device further comprises a volume that variably controls a level of the extracted irregular fluctuation so as to adjust a degree of the desired fluctuation of the pitch of the chorus sound.

DETAILED DESCRIPTION OF THE INVENTION

This invention will be described in further detail by way of embodiments for easier understanding of the present invention. While these embodiments of the present invention will be described using specific terms, such description is for illustrative purposes only, and it is to be understood that changes and variations may be made without departing from the spirit or scope of the appended claims.

Figure 1:
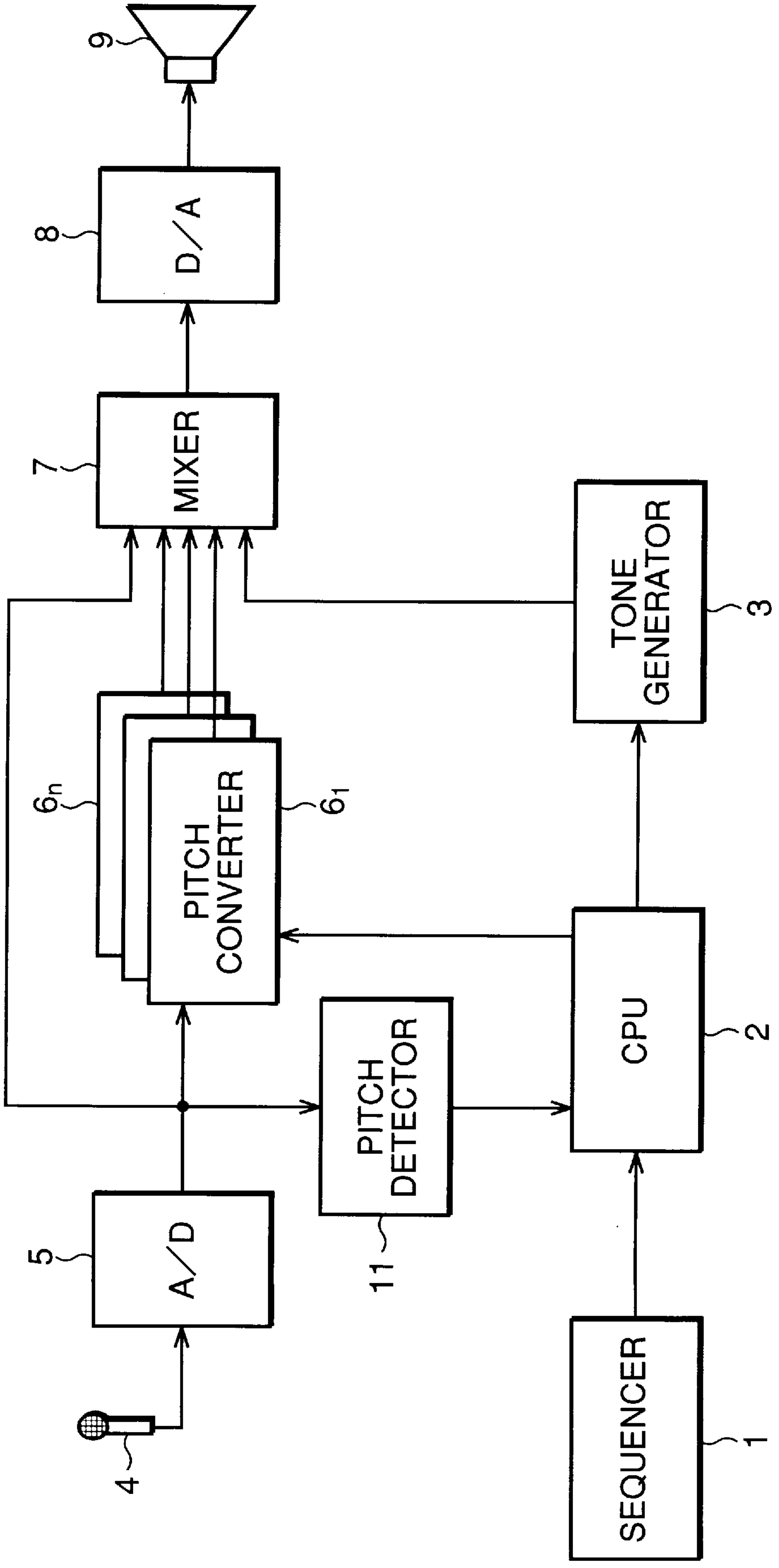
FIG. 1 is a block diagram illustrating a constitution of a chorus apparatus practiced as a first embodiment of the present invention.

FIG. 1 is a block diagram illustrating a constitution of a karaoke apparatus using a chorus apparatus practiced as a first embodiment of the present invention. The karaoke apparatus has a chorus creating capability. In FIG. 1, a sequencer 1 operates under control of a CPU 2 for sequentially reading music information from a storage medium, not shown. This music information contains performance information for controlling generation of a karaoke accompaniment sound for karaoke performance, main melody information representing a reference pitch of a main melody to be sung by a singer, and harmony pitch information for designating a pitch of each chorus sound of one or two background choruses.

The CPU 2 operates based on the music information read by the sequencer 1 to perform control for chorus effect creation and control for karaoke performance. To be more specific, the CPU 2 operates based on the harmony pitch information included in the music information for designating a pitch of a chorus sound to one of pitch converters $\mathbf{6}_1$ through $\mathbf{6}_n$. If the music information of a given piece of music includes a plurality of background choruses, the harmony pitch information is supplied to the CPU 2 for simultaneously designating two or more chorus sounds. In this case, the CPU 2 outputs a plurality of harmony pitch information for designating different pitches of the chorus sounds. In addition, based on the performance information included in the music information, the CPU 2 sends a command to a tone generator 3 to make the same generate an accompaniment sound. If a command for outputting a so-called guide melody is issued by the user, the CPU 2 sends a command based on the main melody information to the tone generator 3 to make the same generate a guide melody sound. The tone generator 3 is provided to generate the accompaniment sound of karaoke performance. Specifically, the tone generator 3 forms a music signal of the accompaniment sound according to the command issued by the CPU 2, and outputs the formed music signal.

A microphone 4 receives a vocal sound uttered by a singer along the accompaniment of karaoke performance, and outputs an analog signal equivalent to the uttered vocal sound. An A/D converter 5 samples this analog signal by a predetermined frequency, quantizes the resultant sampled signal, and outputs the resultant time-sequential digital signal (hereafter, referred to as a vocal sound signal) representing a vocal sound waveform.

The pitch converters $6_1$ through $6_n$ form time-sequential digital signals (hereafter, referred to as a chorus sound signal) of chorus sounds that constitute a consonance or chord together with the vocal sound. Receiving the above-mentioned harmony pitch information, these pitch converters $6_1$ through $6_n$ convert the vocal sound signal supplied from the A/D converter 5 into chorus sound signals having pitches designated by the harmony pitch information, and output the resultant chorus sound signals. The pitch conversion for obtaining the chorus sound signal is performed by a method in which an elementary tone waveform for one period is extracted from the vocal sound signal, and the extracted elementary tone waveform is stored in a memory. The elementary tone waveform is read out repeatedly at a frequency corresponding to the harmony pitch information, by way of example. According to this method, the pitch conversion may be made without changing a formant of the vocal sound so that the chorus sound is substantially the same in voice quality as the original vocal sound, and is different from the vocal sound only in pitch. This pitch conversion technology is disclosed in Japanese Non-examined Patent Publication No. Sho 62-65098, for example.

A mixer 7 mixes altogether the chorus sound signals outputted from the pitch converters $6_1$ through $6_n$, the vocal sound signal outputted from the A/D converter 5, and the accompaniment signal outputted from the tone generator 3, and outputs the resultant mixed signal. A D/A converter 8 converts this mixed signal into an analog signal. This analog signal is supplied to a loudspeaker 9 to be sounded from the same.

In a conventional karaoke apparatus, a chorus sound signal having a pitch strictly designated by the harmony pitch information is generated by pitch converters. On the other hand, the karaoke apparatus according to the present invention detects a pitch fluctuation of a vocal sound signal, and generates a chorus sound signal having a pitch fluctuation similar to the above-mentioned pitch fluctuation by the pitch converters $6_1$ through $6_n$. In the first embodiment, a pitch detector 11 is provided to detect the pitch of a vocal sound signal outputted from the A/D converter 5, thereby enabling the above-mentioned chorus sound signal generation control.

Since a vocal sound signal is obtained when a singer utters words of a song along the accompaniment of the karaoke music, the pitch of the vocal sound signal essentially goes up and down. Therefore, the time variation of the vocal sound signal obtained by the pitch detector 11 includes not only the irregular and natural pitch fluctuation to be used by the first embodiment to modify the chorus sound, but also regular pitch variation along a melody line of the song. In order to obtain the net pitch fluctuation of the vocal sound signal, it is necessary to remove this regular pitch variation from the total variation of the pitch of the vocal sound signal. To realize this, it is necessary to separately obtain reference pitch information representing the essential pitch up/down movement or information about the regular pitch variation correlated to the melody line.

The music information sequentially read by the sequencer 1 includes main melody information. The main melody information includes reference pitch data VP corresponding to a regular pitch of a vocal sound to be uttered by a singer. When the singer sings the main melody, actual pitch data IP of the vocal sound signal sequentially outputted from the A/D converter 5 should represent generally the same variation as the reference pitch data VP to be read sequentially. Therefore, this reference pitch data VP may be regarded as the reference pitch information representative of the regular pitch variation in the vocal sound signal.

Consequently, in the first embodiment, the CPU 2 computes the ratio of the actual pitch data IP with the reference pitch data VP to define IP/VP. Using this ratio IP/VP as a signal reflecting the irregular, natural and unintentional pitch fluctuation of the vocal sound signal, this embodiment performs the pitch control of the chorus sound signal. If the actual pitch exactly coincides with the reference pitch, the ratio IP/VP is equal to value 1. However, in reality, the actual pitch contains the irregular fluctuation so that the ratio IP/VP varies slightly more or less than the value 1 time-dependently during the course of karaoke play.

To be more specific, if pieces of harmony pitch information $SOP_1$ through $SOP_n$ for designating pitches of n chorus sounds are supplied from the sequencer 1, the CPU 2 adds the above-mentioned ratio IP/VP to each of these pieces of the harmony pitch information. Then, the CPU 2 supplies the addition results to the pitch converters $6_1$ through $6_n$ as the modified harmony pitch information $OPIT_1$ through $OPIT_n$.

Each of the pitch converters $6_1$ through $6_n$ extracts an elementary tone waveform from the vocal sound signal supplied from the A/D converter 5, and stores the extracted waveform in a memory. This elementary tone waveform is repeatedly read at a pitch period corresponding to each of the harmony pitch information $OPIT_1$ through $OPIT_n$ so as to create a chorus sound signal. Each piece of the modified harmony pitch information $OPIT_1$ through $OPIT_n$ includes the above-mentioned ratio IP/VP. Accordingly, each chorus sound signal outputted from each of the pitch converters $6_1$ through $6_n$ is provided with an irregular pitch fluctuation similar to that of the vocal sound signal. Thus, according to the first embodiment, the chorus sound signal is provided with the natural pitch fluctuation of the vocal sound signal. The first embodiment can generate a naturally sounding chorus sound similar to the sound actually uttered by a human being, thereby providing an agreeable chorus effect.

Figure 2:
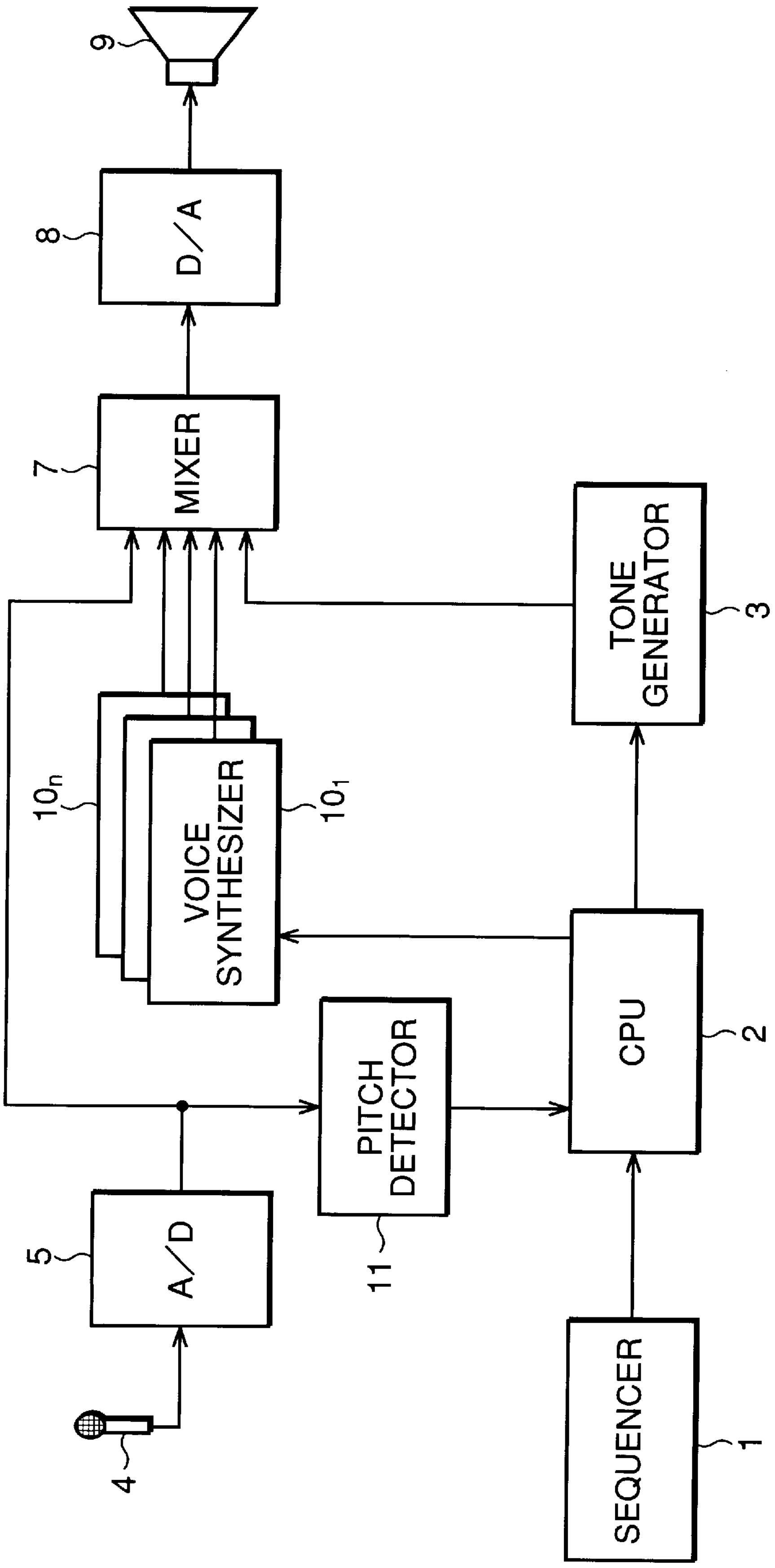
FIG. 2 is a block diagram illustrating a constitution of a chorus apparatus practiced as a second embodiment of the present invention.

FIG. 2 is a block diagram illustrating a constitution of a karaoke apparatus practiced as a second embodiment of the present invention. In the first embodiment, the chorus sound signal is derived from the vocal sound signal by the pitch converters $6_1$ through $6_n$. In the karaoke apparatus of the second embodiment, voice synthesizers $10_1$ through $10_n$ are provided instead of the pitch converters $6_1$ through $6_n$. These voice synthesizers $10_1$ through $10_n$ synthesize a chorus sound having a pitch corresponding to the harmony pitch information supplied from the CPU 2. The chorus sound signal is synthesized not by performing pitch conversion on a vocal sound signal, but by voice synthesis. In a manner similar to that of the above-mentioned first embodiment, pieces of the modified harmony pitch information $OPIT_1$ through $OPIT_n$ having irregular fluctuation are generated by the CPU 2. Based on these pieces of the harmony pitch information, the voice synthesizers $\mathbf{10}_1$ through $\mathbf{10}_n$ synthesize chorus sound signals having a natural pitch fluctuation.

Figure 3:
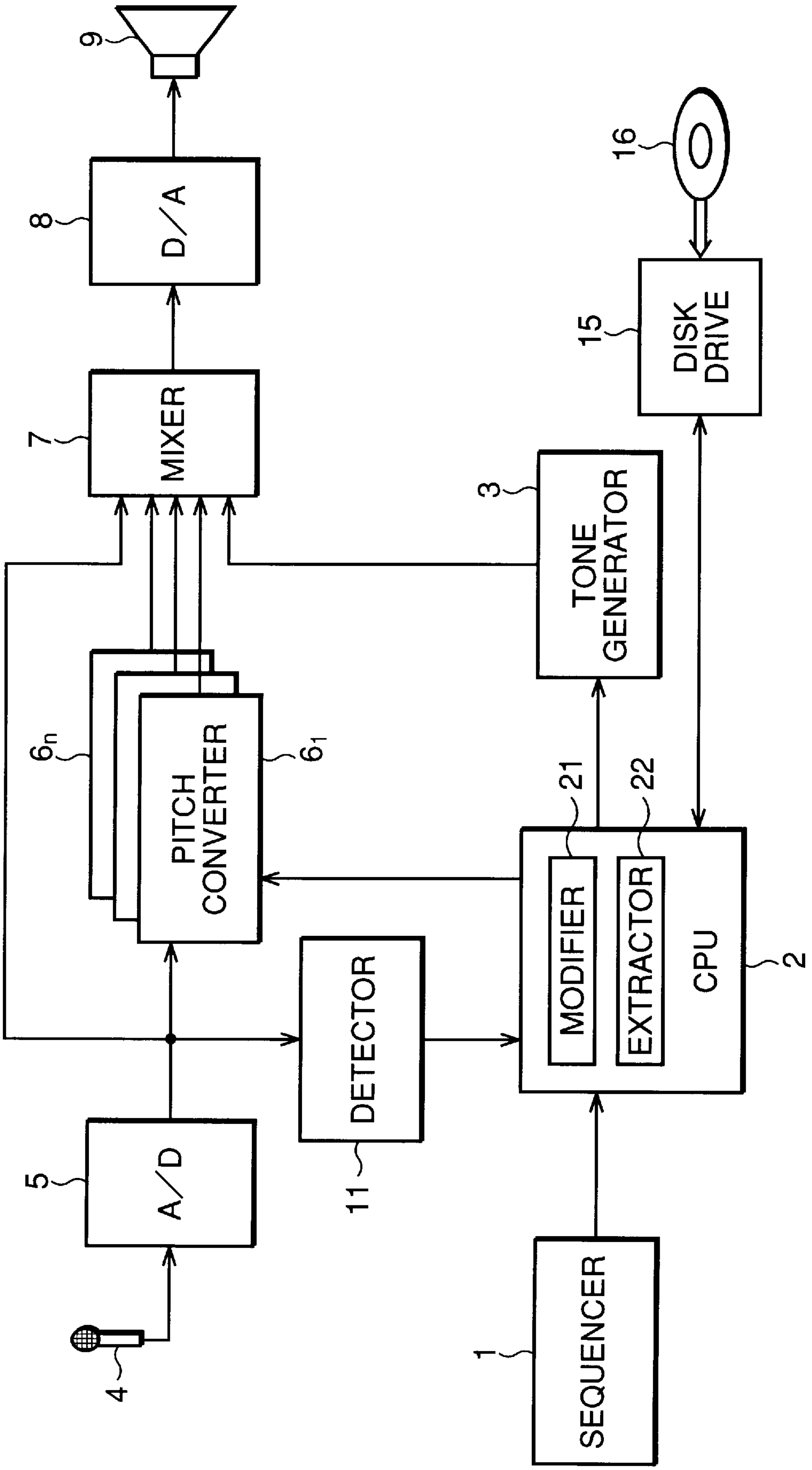
FIG. 3 is a block diagram illustrating a third embodiment of the inventive chorus apparatus.

FIG. 3 shows a third embodiment of the chorus apparatus. As shown, the inventive chorus apparatus is constructed for creating a chorus sound to accompany a vocal sound which is sung by a singer. In the chorus apparatus, a providing device in the form of the sequencer 1 provides music information including reference pitch information which indicates a regular variation of an actual pitch of the vocal sound and harmony pitch information which determines a harmony pitch of the chorus sound. A detecting device in the form of the detector 11 detects the actual pitch of the vocal sound containing the regular variation and an irregular fluctuation which overlaps the regular variation. A controlling device in the form of the CPU 2 extracts the irregular fluctuation of the actual pitch from the vocal sound according to the reference pitch information, and modifies the harmony pitch information to impart thereto a desired fluctuation corresponding to the irregular fluctuation extracted from the vocal sound. A generating device in the form of the pitch converters $\mathbf{6}_1$ through $\mathbf{6}_n$ operates according to the modified harmony pitch information for generating the chorus sound containing the desired fluctuation over the harmony pitch. A mixing device in the form of the mixer 7 mixes the vocal sound and the chorus sound with each other. Preferably, the generating device comprises the pitch converter that converts the actual pitch of the vocal sound according to the harmony pitch information to create the chorus sound. Alternatively, the generating device may comprise a voice synthesizer that synthesizes the chorus sound according to the harmony information independently from the vocal sound. Preferably, the controlling device comprises an extractor 22 that calculates a ratio of the actual pitch IP relative to the reference pitch VP so as to extract the irregular fluctuation in terms of the calculated ratio IP/VP, and a modifier 21 that adds the calculated ratio to the harmony pitch information so as to modify the harmony pitch information.

Further, the third embodiment of the inventive chorus apparatus shown in FIG. 3 contains a disk drive 15 for receiving a machine readable media 16 such as a floppy disk or a CD-ROM disk. The machine readable media 16 contains instructions in the form of programs executed by the CPU 2 for causing a chorus machine implemented in the karaoke apparatus to perform operation of creating a chorus sound to accompany a vocal sound which is sung by a singer. The operation comprises the steps of providing music information including reference pitch information which indicates a regular variation of an actual pitch of the vocal sound and harmony pitch information which determines a harmony pitch of the chorus sound, detecting the actual pitch of the vocal sound containing the regular variation and an irregular fluctuation which overlaps the regular variation, extracting the irregular fluctuation of the actual pitch from the vocal sound according to the reference pitch information, modifying the harmony pitch information to impart thereto a desired fluctuation corresponding to the irregular fluctuation extracted from the vocal sound, generating the chorus sound containing the desired fluctuation over the harmony pitch according to the modified harmony pitch information, and mixing the vocal sound and the chorus sound with each other. The step of extracting comprises calculating a ratio of the actual pitch relative to the reference pitch so as to extract the irregular fluctuation in terms of the calculated ratio, and the step of modifying comprises adding the calculated ratio to the harmony pitch information so as to modify the harmony pitch information.

Figure 4:
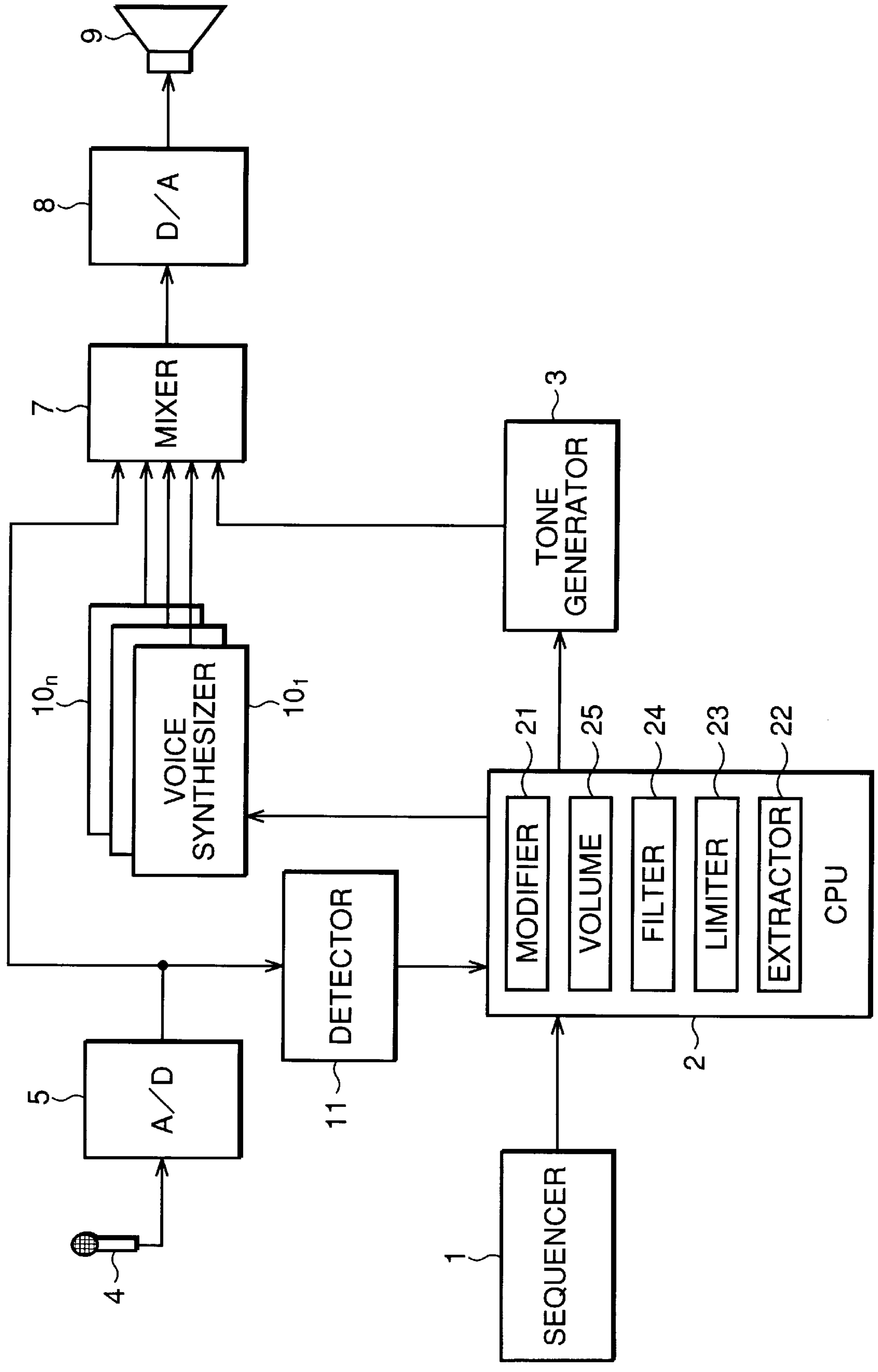
FIG. 4 is a block diagram illustrating a fourth embodiment of the inventive chorus apparatus.

The present invention is not limited to the above-mentioned three embodiments. Variations may be made without departing from the spirit or scope of the appended claims. For example, the following fourth embodiment is available as shown in FIG. 4.

(1) If the singing gets out of tune from a main melody, the actual pitch data IP of the vocal sound signal might considerably deviate from the reference pitch data VP. If this happens, an excess fluctuation is given to the pitch of the chorus sound signal. To overcome this problem, limiter processing is performed on the time-sequential ratio IP/VP of the actual pitch data IP of the vocal sound signal to the reference pitch data VP. For example, the cent value of the ratio IP/VP is limited to a range of ±50 cents. Further, filter processing is performed on the resultant time-sequential value of the ratio IP/VP through a low-pass filter having a cutoff frequency of about 4 Hz. Then, the filtered time-sequential value is added to the harmony pitch information $SOP_1$ through $SOP_n$ that designates the pitches of chorus sounds. The addition results are supplied to the voice synthesizers $\mathbf{10}_1$ through $\mathbf{10}_n$ as the modified harmony pitch information $OPIT_1$ through $OPIT_n$. This setup prevents an excess fluctuation from being applied to the pitch of the chorus sound signals.

(2) Instead of performing the above-mentioned limiter processing and filter processing, the amplitude of the ratio IP/VP may be compressed by a compressor.

(3) When a person does not sing well, the interval of his or her song often fluctuates. This fluctuation in the interval disadvantageously causes fluctuation in the interval of the chorus sound signal in the above-mentioned embodiment. To overcome this problem, low-frequency elimination processing is performed on the time-sequential ratio IP/VP of the actual pitch data IP of the vocal sound signal to the reference pitch data VP, thereby eliminating a noise component equivalent to the interval fluctuation. Then, the time variation component remaining in the time-sequential ratio is regarded as the natural pitch fluctuation of the vocal sound. This fluctuation is added to the initial harmony pitch information $SOP_1$ through $SOP_n$ for designating the chorus sound pitches. The addition results are supplied to the voice synthesizers $\mathbf{10}_1$ through $\mathbf{10}_n$ as the modified output pitch information $OPIT_1$ through $OPIT_n$.

(4) The user can adjust how much the pitch fluctuation of the vocal sound signal is to be reflected onto the chorus sound signal. Namely, a volume control for adjusting the pitch fluctuation is arranged in the karaoke apparatus. The above-mentioned IP/VP is multiplied by a coefficient corresponding to the operational amount of this volume control. The multiplication result is added to modify the output pitch information $OPIT_1$ through $OPIT_n$. The result of this addition is used for the pitch control of the chorus sound signal.

As described above, in the fourth embodiment of the chorus apparatus shown in FIG. 4, the controlling device composed of the CPU 2 further comprises a limiter 23 that limits the calculated ratio when the actual pitch falls out of tune relative to the reference pitch so as to avoid an excessive fluctuation of the pitch of the chorus sound.

Preferably, the controlling device further comprises a filter 24 that filters the extracted irregular fluctuation containing a true fluctuation component having a high frequency and a false fluctuation component having a low frequency caused by the regular pitch variation relative to the reference pitch so as to extract only the true fluctuation component. Preferably, the controlling device further comprises a volume 25 that variably controls a level of the extracted irregular fluctuation so as to adjust a degree of the desired fluctuation of the pitch of the chorus sound.

The inventive karaoke apparatus of the fourth embodiment is constructed for creating an accompaniment sound and a chorus sound to accompany a vocal sound which is sung by a singer. The karaoke apparatus comprises means composed of the sequencer 1 for providing music information used to create the accompaniment sound, the music information containing reference pitch information which indicates a regular variation of an actual pitch of the vocal sound and harmony pitch information which determines a harmony pitch of the chorus sound, means composed of the tone generator 3 for sequentially generating the accompaniment sound according to the provided music information, means composed of the microphone 4 for collecting the vocal sound which is vocalized by the singer along the accompaniment sound, means composed of the detector 11 for detecting the actual pitch of the vocal sound containing the regular variation and an irregular fluctuation which overlaps the regular variation, means composed of the extractor 22 for extracting the irregular fluctuation of the actual pitch from the vocal sound according to the reference pitch information, means composed of the modifier 21 for modifying the harmony pitch information to impart thereto a desired fluctuation corresponding to the irregular fluctuation extracted from the vocal sound, means composed of the voice synthesizers $\mathbf{10}_1$ through $\mathbf{10}_n$ operative according to the modified harmony pitch information for generating the chorus sound containing the desired fluctuation over the harmony pitch, and means composed of the mixer 7 for mixing the vocal sound to the chorus sound and the accompaniment sound.

As mentioned above and according to the invention, a chorus sound having a pitch fluctuation similar to that of a vocal sound inputted from a microphone is generated, thereby realizing a naturally sounding chorus similar to that actually performed by a human being.

What is claimed is:

1. A chorus apparatus for creating a chorus sound to accompany a vocal sound which is sung by a singer, the chorus apparatus comprising:

a providing device that provides music information including reference pitch information which indicates a regular variation of an actual pitch of the vocal sound and harmony pitch information which determines a harmony pitch of the chorus sound;

a detecting device that detects the actual pitch of the vocal sound containing the regular variation as well as an irregular and natural fluctuation which overlaps the regular variation;

a controlling device that extracts the irregular and natural fluctuation of the actual pitch from the vocal sound according to the reference pitch information and that modifies the harmony pitch information to impart thereto a desired fluctuation corresponding to the irregular and natural fluctuation extracted from the vocal sound;

a generating device that operates according to the modified harmony pitch information for generating the chorus sound containing the desired fluctuation corresponding to the irregular and natural fluctuation over the harmony pitch; and a mixing device that mixes the vocal sound and the chorus sound with each other.

2. A chorus apparatus according to claim 1, wherein the generating device comprises a converter that converts the actual pitch of the vocal sound according to the harmony pitch information to create the chorus sound.

3. A chorus apparatus according to claim 1, wherein the generating device comprises a synthesizer that synthesizes the chorus sound according to the harmony information independently from the vocal sound.

4. A chorus apparatus according to claim 1, wherein the controlling device further comprises a filter that filters the extracted irregular and natural fluctuation containing a true fluctuation component having a high frequency and a false fluctuation component having a low frequency caused by the regular pitch variation relative to the reference pitch so as to extract only the true fluctuation component.

5. A chorus apparatus according to claim 1, wherein the controlling device further comprises a volume that variably controls a level of the extracted irregular and natural fluctuation so as to adjust a degree of the desired fluctuation of the pitch of the chorus sound.

6. A chorus apparatus for creating a chorus sound to accompany a vocal sound which is sung by a singer, the chorus apparatus comprising:

a providing device that provides music information including reference pitch information which indicates a regular variation of an actual pitch of the vocal sound and harmony pitch information which determines a harmony pitch of the chorus sound;

a detecting device that detects the actual pitch of the vocal sound containing the regular variation as well as an irregular and natural fluctuation which overlaps the regular variation;

a controlling device that extracts the irregular and natural fluctuation of the actual pitch from the vocal sound according to the reference pitch information and that modifies the harmony pitch information to impart thereto a desired fluctuation corresponding to the irregular and natural fluctuation extracted from the vocal sound, wherein the controlling device comprises an extractor that calculates a ratio of the actual pitch relative to the reference pitch so as to extract the irregular and natural fluctuation in terms of the calculated ratio, and a modifier that adds the calculated ratio to the harmony pitch information so as to modify the harmony pitch information;

a generating device that operates according to the modified harmony pitch information for generating the chorus sound containing the desired fluctuation corresponding to the irregular and natural fluctuation over the harmony pitch; and a mixing device that mixes the vocal sound and the chorus sound with each other.

7. A chorus apparatus according to claim 6, wherein the controlling device further comprises a limiter that limits the calculated ratio when the actual pitch falls out of tune relative to the reference pitch so as to avoid an excessive fluctuation of the pitch of the chorus sound.

8. A karaoke apparatus for creating an accompaniment sound and a chorus sound to accompany a vocal sound which is sung by a singer, the karaoke apparatus comprising:

means for providing music information used to create the accompaniment sound, the music information containing reference pitch information which indicates a regular variation of an actual pitch of the vocal sound and harmony pitch information which determines a harmony pitch of the chorus sound;

means for sequentially generating the accompaniment sound according to the provided music information;

means for collecting the vocal sound which is vocalized by the singer along the accompaniment sound;

means for detecting the actual pitch of the vocal sound containing the regular variation and an irregular and natural fluctuation which overlaps the regular variation;

means for extracting the irregular and natural fluctuation of the actual pitch from the vocal sound according to the reference pitch information;

means for modifying the harmony pitch information to impart thereto a desired fluctuation corresponding to the irregular and natural fluctuation extracted from the vocal sound;

means operative according to the modified harmony pitch information for generating the chorus sound containing the desired fluctuation corresponding to the irregular and natural fluctuation over the harmony pitch; and means for mixing the vocal sound to the chorus sound and the accompaniment sound.

9. A method of creating a chorus sound to accompany a vocal sound which is sung by a singer, the method comprising the steps of:

providing music information including reference pitch information which indicates a regular variation of an actual pitch of the vocal sound and harmony pitch information which determines a harmony pitch of the chorus sound;

detecting the actual pitch of the vocal sound containing the regular variation and an irregular and natural fluctuation which overlaps the regular variation;

extracting the irregular and natural fluctuation of the actual pitch from the vocal sound according to the reference pitch information;

modifying the harmony pitch information to impart thereto a desired fluctuation corresponding to the irregular and natural fluctuation extracted from the vocal sound;

generating the chorus sound containing the desired fluctuation corresponding to the irregular and natural fluctuation over the harmony pitch according to the modified harmony pitch information; and mixing the vocal sound and the chorus sound with each other.

10. A method according to claim 9, wherein the step of extracting further comprises filtering the extracted irregular and natural fluctuation containing a true fluctuation component having a high frequency and a false fluctuation component having a low frequency caused by the regular pitch variation relative to the reference pitch so as to extract only the true fluctuation component.

11. A method of creating a chorus sound to accompany a vocal sound which is sung by a singer, the method comprising the steps of:

providing music information including reference pitch information which indicates a regular variation of an actual pitch of the vocal sound and harmony pitch information which determines a harmony pitch of the chorus sound;

detecting the actual pitch of the vocal sound containing the regular variation and an irregular and natural fluctuation which overlaps the regular variation;

extracting the irregular and natural fluctuation of the actual pitch from the vocal sound according to the reference pitch information, wherein the step of extracting comprises calculating a ratio of the actual pitch relative to the reference pitch so as to extract the irregular and natural fluctuation in terms of the calculated ratio;

modifying the harmony pitch information to impart thereto a desired fluctuation corresponding to the irregular and natural fluctuation extracted from the vocal sound, wherein the step of modifying comprises adding the calculated ratio to the harmony pitch information so as to modify the harmony pitch information;

generating the chorus sound containing the desired fluctuation corresponding to the irregular and natural fluctuation over the harmony pitch according to the modified harmony pitch information; and mixing the vocal sound and the chorus sound with each other.

12. A method according to claim 11, wherein the step of extracting further comprises limiting the calculated ratio when the actual pitch falls out of tune relative to the reference pitch so as to avoid an excessive fluctuation of the pitch of the chorus sound.

13. A machine readable media containing instructions for causing a chorus machine to perform operation of creating a chorus sound to accompany a vocal sound which is sung by a singer, wherein the operation comprises the steps of:

providing music information including reference pitch information which indicates a regular variation of an actual pitch of the vocal sound and harmony pitch information which determines a harmony pitch of the chorus sound;

detecting the actual pitch of the vocal sound containing the regular variation and an irregular and natural fluctuation which overlaps the regular variation;

extracting the irregular and natural fluctuation of the actual pitch from the vocal sound according to the reference pitch information;

modifying the harmony pitch information to impart thereto a desired fluctuation corresponding to the irregular and natural fluctuation extracted from the vocal sound;

generating the chorus sound containing the desired fluctuation corresponding to the irregular and natural fluctuation over the harmony pitch according to the modified harmony pitch information; and mixing the vocal sound and the chorus sound with each other.

14. A machine readable media containing instructions for causing a chorus machine to perform operation of creating a chorus sound to accompany a vocal sound which is sung by a singer wherein the operation comprises the steps of:

providing music information including reference pitch information which indicates a regular variation of an actual pitch of the vocal sound and harmony pitch information which determines a harmony pitch of the chorus sound;

detecting the actual pitch of the vocal sound containing the regular variation and an irregular and natural fluctuation which overlaps the regular variation;

extracting the irregular and natural fluctuation of the actual pitch from the vocal sound according to the reference pitch information, wherein the step of extracting comprises calculating a ratio of the actual pitch relative to the reference pitch so as to extract the irregular and natural fluctuation in terms of the calculated ratio;

modifying the harmony pitch information to impart thereto a desired fluctuation corresponding to the irregular and natural fluctuation extracted from the vocal sound, wherein the step of modifying comprises adding the calculated ratio to the harmony pitch information so as to modify the harmony pitch information;

generating the chorus sound containing the desired fluctuation corresponding to the irregular and natural fluctuation over the harmony pitch according to the modified harmony pitch information; and mixing the vocal sound and the chorus sound with each other.

15. A machine readable media according to claim 14, wherein the step of extracting further comprises limiting the calculated ratio when the actual pitch falls out of tune relative to the reference pitch so as to avoid an excessive fluctuation of the pitch of the chorus sound.

16. A machine readable media according to claim 14, wherein the step of extracting further comprises filtering the extracted irregular and natural fluctuation containing a true fluctuation component having a high frequency and a false fluctuation component having a low frequency caused by the regular pitch variation relative to the reference pitch so as to extract only the true fluctuation component.

* * * * *